United States Patent
Huang et al.

(10) Patent No.: US 10,656,362 B2
(45) Date of Patent: May 19, 2020

(54) GAMMA GROOVE ARRAYS FOR INTERCONNECTING AND MOUNTING DEVICES

(71) Applicant: GLOBALFOUNDRIES Singapore Pte. Ltd., Singapore (SG)

(72) Inventors: Yamin Huang, Singapore (SG); Bo Liu, Singapore (SG); Zhihong Mai, Singapore (SG); Jeffrey C Lam, Singapore (SG)

(73) Assignee: GLOBALFOUNDRIES SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/861,697

(22) Filed: Jan. 4, 2018

(65) Prior Publication Data

US 2019/0204525 A1  Jul. 4, 2019

(51) Int. Cl.
*G02B 6/44* (2006.01)
*G02B 6/36* (2006.01)
*H01L 21/311* (2006.01)

(52) U.S. Cl.
CPC ......... *G02B 6/4479* (2013.01); *G02B 6/3624* (2013.01); *G02B 6/3636* (2013.01)

(58) Field of Classification Search
None
See application file for complete search history.

(56) References Cited

U.S. PATENT DOCUMENTS

| | | | |
|---|---|---|---|
| 4,131,907 A | 12/1978 | Ouyang | |
| 4,810,557 A | 3/1989 | Blonder | |
| 5,009,475 A * | 4/1991 | Knudson | G02B 6/04 385/116 |
| 5,346,583 A * | 9/1994 | Basavanhally | G02B 6/322 156/273.3 |
| 5,418,880 A * | 5/1995 | Lewis | G02B 5/04 359/625 |

(Continued)

FOREIGN PATENT DOCUMENTS

| | | |
|---|---|---|
| EP | 1326109 A2 | 9/2003 |
| JP | 2004054114 A | 2/2004 |

(Continued)

OTHER PUBLICATIONS

A.K.Chu et al., Silicon V grooves fabricated using Ta 2 O 5 etch mask prepared by room-temperature magnetron sputtering, Journal of Vacuum Sciences & Technology B, 2001, pp. 1169-1172, vol. 19—Issue 14, American Vacuum Society.

(Continued)

*Primary Examiner* — Shamim Ahmed
(74) *Attorney, Agent, or Firm* — Thompson Hine LLP; Anthony Canale

(57) ABSTRACT

Devices with gamma (γ) grooves are disclosed. The γ grooves can be used to form optical fiber arrays. The γ grooves can be formed using a dry etch, such as RIE, by modifying resist features of an etch mask to have convex curved sidewalls. The profile of the resist features is transferred to the substrate by the dry etch to form the γ grooves. The γ grooves are formed without K containing etchants, avoiding $K^+$ ions contamination of process tools as well as health issues caused by handling alkali containing devices.

9 Claims, 9 Drawing Sheets

(56) References Cited

U.S. PATENT DOCUMENTS

| | | | | |
|---|---|---|---|---|
| 5,592,333 | A * | 1/1997 | Lewis | G02B 5/045 |
| | | | | 359/619 |
| 5,835,659 | A * | 11/1998 | Ota | G02B 6/2746 |
| | | | | 385/137 |
| 6,215,946 | B1 | 4/2001 | Sherrer | |
| 6,681,496 | B2 | 1/2004 | Law et al. | |
| 6,870,992 | B2 | 3/2005 | Grosjean et al. | |
| 6,872,630 | B1 * | 3/2005 | Chen | G03F 9/708 |
| | | | | 257/E23.179 |
| 6,939,060 | B2 | 9/2005 | Tamura et al. | |
| 7,266,282 | B2 | 9/2007 | Qiu et al. | |
| 9,519,112 | B2 | 12/2016 | Huang | |
| 2003/0012544 | A1 | 1/2003 | Matsumoto | G02B 6/3676 |
| | | | | 385/137 |
| 2003/0059180 | A1 * | 3/2003 | Tamura | G02B 6/2551 |
| | | | | 385/96 |
| 2004/0084755 | A1 * | 5/2004 | Nguyen | H01L 21/0273 |
| | | | | 257/620 |
| 2005/0215054 | A1 * | 9/2005 | Rasmussen | H01L 21/30608 |
| | | | | 438/667 |
| 2009/0057700 | A1 * | 3/2009 | Jin | H01L 33/20 |
| | | | | 257/98 |

FOREIGN PATENT DOCUMENTS

| | | |
|---|---|---|
| TW | 201426067 A | 7/2014 |
| WO | 2017147390 A1 | 8/2017 |

OTHER PUBLICATIONS

Richard Soref, Silicon photonics technology: past, present and future, Optoelectronic Integration on Silicon II, 2005, vol. 5730, SPIE, US.

Yaocheng Shi et al., Fabrication of High Precision Self-Aligned V-Grooves Integrated on Silica-on-Silicon Chips, IEEE Photonics Technology Letters, Jun. 15, 2014, pp. 1169-1171, vol. 26—Issue 12, IEEE.

Kris Naessens et al., Excimer laser ablated U-groove alignment structure for optical fibre arrays, Proceedings Symposium IEEE/LEOS Benelux Chapter, 1999, pp. 187-190, Belgium.

Taiwan Intellectual Property Office, Examination Report issued in Application No. 107110279 dated Oct. 25, 2019, and English translation thereof.

* cited by examiner

GAMMA GROOVE ARRAYS FOR INTERCONNECTING AND MOUNTING DEVICES

FIELD OF THE INVENTION

This present disclosure generally relates to devices with gamma grooves. The gamma grooves may be employed in optical fiber arrays to maintain optical fibers in pre-determined positions.

BACKGROUND

Fiber arrays are used for various types of applications, such as silicon photonic (SiPh) systems, including optical switching for communications as well as sensing applications where spatial optical data is employed, such as DNA sequencing, astronomy and nuclear research. The ends of optical fibers of the fiber array are maintained in fixed positions using a fiber array block with grooves or channels. The optical fibers are aligned in relations to other components of the optical system, such as other optical fibers, a planar waveguide or an opto-electronic device.

Conventional fiber array blocks employ v-grooves to fix the positions of the optical fibers. The v-grooves are formed by wet chemical etching technology which requires the usage of alkaline solutions containing KOH. However, such KOH solutions often cause contamination issues. In particular, $K^+$ ion is an extremely fast-diffusion alkali metal ion which is detrimental to metal oxide semiconductor (MOS) devices. Furthermore, handling fiber arrays contaminated with $K^+$ ions can cause health issues, making them a safety hazard.

U-groove fiber array blocks have been investigated. U-grooves are formed by an excimer laser ablation technology. However, laser ablation is not capable of precisely controlling small core pitches due to large laser beam size, which typically is about a few square centimeters. This may result in optical fibers being loosely fitted into the u-grooves, adversely affecting coupling efficiency. In addition, laser ablation is not feasible for manufacturing commercial fiber arrays because of long processing time due to small beam size.

The present disclosure is directed to fiber array blocks and fiber arrays.

SUMMARY

Embodiments generally relate to devices with gamma grooves. In one embodiment, a method of forming a device is disclosed. A substrate is provided. A patterned photoresist etch mask is formed on the substrate. The patterned photoresist etch mask includes first and second elongated spherical photoresist features with convex curved photoresist sidewalls. The first and second elongated spherical photoresist features are separated by a space which exposes the substrate surface. A dry etch is performed using the patterned photoresist etch mask. The etch etches the exposed surface of the substrate to form a gamma ($\gamma$) groove having convex curved groove sidewalls.

In another embodiment, a device is disclosed. The device includes a substrate. A gamma ($\gamma$) groove is disposed on the substrate. The $\gamma$ groove includes convex groove sidewalls.

In yet another embodiment, a method of forming a device is disclosed. A substrate is provided. A patterned photoresist etch mask is formed on the substrate. The patterned photoresist etch mask includes a plurality of elongated spherical photoresist features with convex curved photoresist sidewalls. Adjacent elongated spherical photoresist features are separated by a space which exposes the substrate surface. A dry etch is performed using the patterned photoresist etch mask. The etch etches the exposed surface of the substrate to form an array of gamma ($\gamma$) grooves having convex curved groove sidewalls.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure. In the following description, various embodiments of the present disclosure are described with reference to the following drawings, in which.

DETAILED DESCRIPTION

Embodiments generally relate to devices. More particularly, embodiments relate to devices which include gamma ($\gamma$) grooves. The $\gamma$ grooves may be used for different purposes. In one embodiment, the devices include fiber arrays with $\gamma$ grooves for positioning ends of optical fibers in fixed predetermined positions. The fiber arrays can be incorporated into, for example, various types of SiPh systems, such as optical fiber communication systems as well as sensing systems where spatial optical data is employed, such as DNA sequencing, astronomy and nuclear research.

Figure 1A:
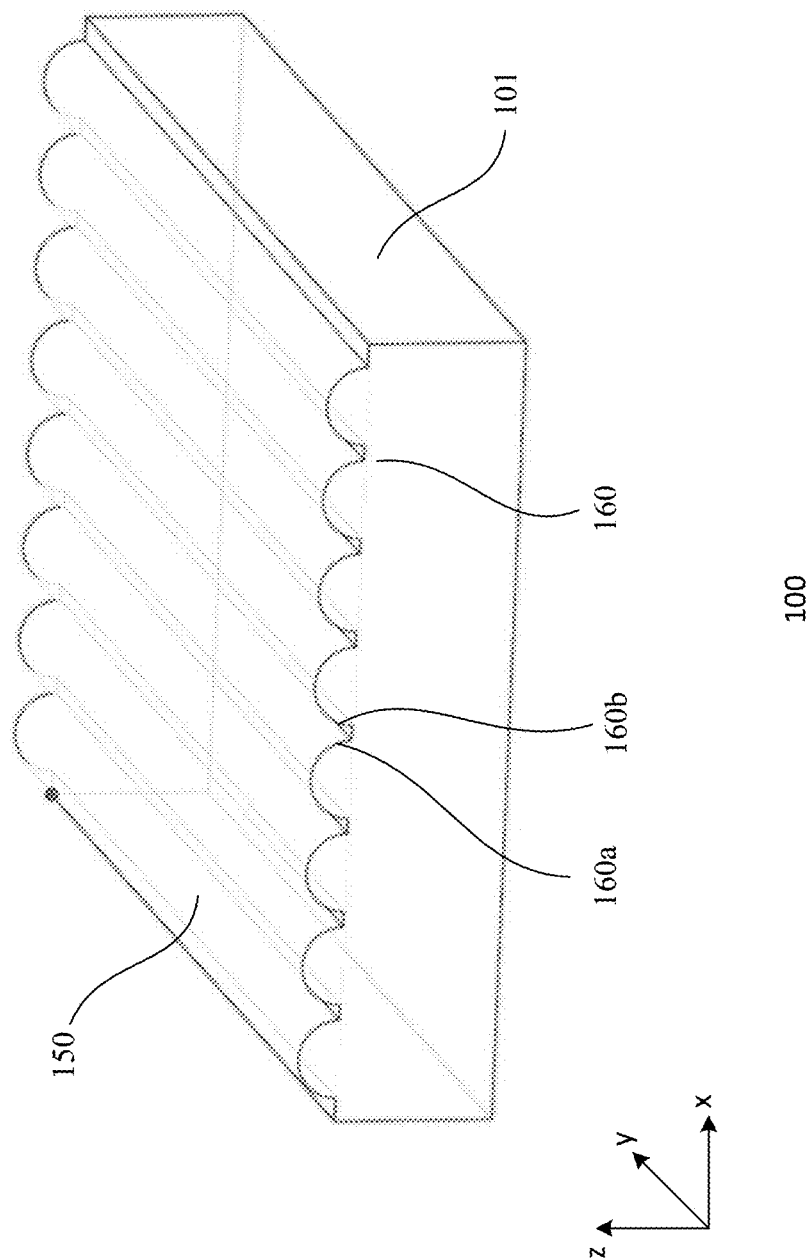
FIG. 1a shows a 3-dimensional view of an embodiment of a device with gamma ($\gamma$) grooves.
Figure 1B:
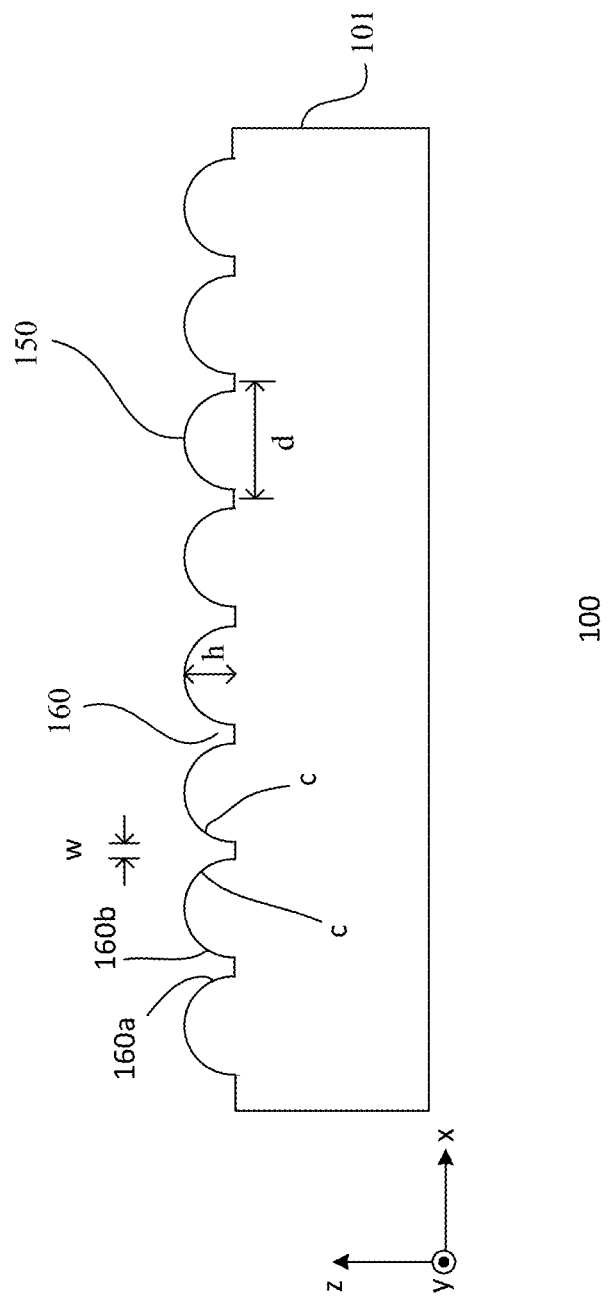
FIG. 1b shows a cross-sectional view of an embodiment of a device with $\gamma$ grooves.

FIGS. 1a-1b show various views of an embodiment of a device 100. In particular, FIG. 1a shows a simplified 3-dimensional view of a device 100 while FIG. 1b shows a cross-sectional view of the device 100 along the x direction. Referring to FIGS. 1a-1b, the device includes a substrate 101. The device may be a fiber array block for maintaining fibers of the fiber array in position. Other types of devices may also be useful. The substrate, in one embodiment, is a silicon substrate. Providing other types of substrates may also be useful. The silicon substrate may be a silicon (100) substrate. Substrates having other crystalline orientations may also be employed. The substrate may, for example, be about 1000 µm thick. Other thicknesses may also be useful.

The substrate includes at least one $\gamma$ grooves 160. The $\gamma$ groove is disposed between adjacent elongated members 150. As shown, the substrate includes a plurality of $\gamma$ grooves and elongated members. Sidewalls 160a-b of a groove are convex sidewalls, resulting in a $\gamma$ groove. The grooves, as shown, are disposed along the γ direction. The γ groove or grooves may be employed to position ends of optical fibers of a fiber array. Providing γ grooves for other purposes may also be useful.

As shown, the substrate is a bare substrate on which the γ grooves are formed. In some embodiments, the substrate may include a device layer (not shown). The device layer may serve as a layer on which γ grooves are formed. For example, the device layer may be sufficiently thick to accommodate the γ grooves. The device layer, for example, may be a silicon oxide layer. Other types of device layers, such as polymer layers, may also serve as a device layer.

In a preferred embodiment, the γ grooves of the fiber array block are symmetrical. For example, width w of the grooves, height h and curvature c of the convex sidewalls are symmetrical, forming symmetrical γ grooves. In the case of a fiber array, the dimensions of a width w is selected to enable precise and accurate positioning of optical fibers with the desired diameter. The fiber diameter, for example, includes the housing and fiber core. The diameter of the fibers should be greater than w. Since the γ grooves have convex curved sidewalls, the fibers can be precisely fixed into position in the γ grooves. Furthermore, the γ grooves can fit a wide range of fiber widths due to the convex curved sidewalls. Providing non-symmetrical grooves may also be useful. For example, non-symmetrical grooves may be provided for fibers with different diameters.

As an example, the height h of the grooves may be about 80 μm and the width w may be about 100 μm. Other heights and widths may also be useful. The height and width may depend on the diameter of the fibers. For example, the width w should be sufficient to accommodate the fibers. The width w of the grooves may increase as the diameter of the optical fibers increases, and vice versa.

In one embodiment, the γ grooves of the fiber array block have symmetrical pitch. For example, distance d between adjacent grooves are the same for the grooves of the array block. The distance d may be referred to as the core pitch. For example, d is the distance between cores of adjacent fibers. The distance d may be about 125 μm. Providing γ grooves having other core pitches or non-symmetrical pitches may also be useful. The core pitch of the array may depend on the applications of the optical coupling device. For example, the core pitch of the array depends on the pitch of the gratings of a silicon photonics (SiPh) device. The number of the γ grooves, for example, determines the number of channels for accommodating optical fibers.

In one embodiment, the elongated members are created using mask and etch techniques without the use of $K^+$ ions containing etchants. In one embodiment, a dry etch using a patterned etch mask is used to form the elongated members. The dry etch, for example, includes a plasma etch, a reactive ion etch or ion milling. Table 1 below shows an exemplary recipe of a $K^+$ ion free dry etch to form the elongated members:

TABLE 1

Dry Etch Recipe

| Pressure | 5 mTorr |
|---|---|
| Chiller Temperature | 20° C. |
| $CHF_3$/100 sccm | 60 sccm |
| $O_2$/100 sccm | 20 sccm |
| He/50 sccm | 5 sccm |
| RF Forward Power | 90 Watt |

It is understood that the recipe of Table 1 is exemplary and other dry etch recipes may also be useful.

The mask includes a patterned photoresist mask. For example, the patterned photoresist mask is patterned using photolithography, such as by exposing the resist layer with an exposure source using a reticle with the desired pattern. The pattern of the reticle is transferred to the resist layer after development, exposing regions of the substrate to be etched. The features of the patterned photoresist mask have a uniform thickness. The patterned photoresist mask is shaped to form curved or γ features. This facilitates in forming γ grooves on the substrate. In the case of uniformly pitched γ grooves, the patterned photoresist mask features are uniformly spaced. Alternatively, non-uniformly pitched γ grooves can be formed by varying the distance between patterned photoresist mask features.

As described, the γ grooves are created without $K^+$ ions containing etchant. This avoids reliability issues of MOS devices related to $K^+$ ions contamination as well as safety or health issues related to handling of alkaline for forming such devices. In addition, the ability to create the γ grooves using mask and etch techniques, high throughput and low cost fiber arrays with precise positioning can be achieved.

Figure 2:
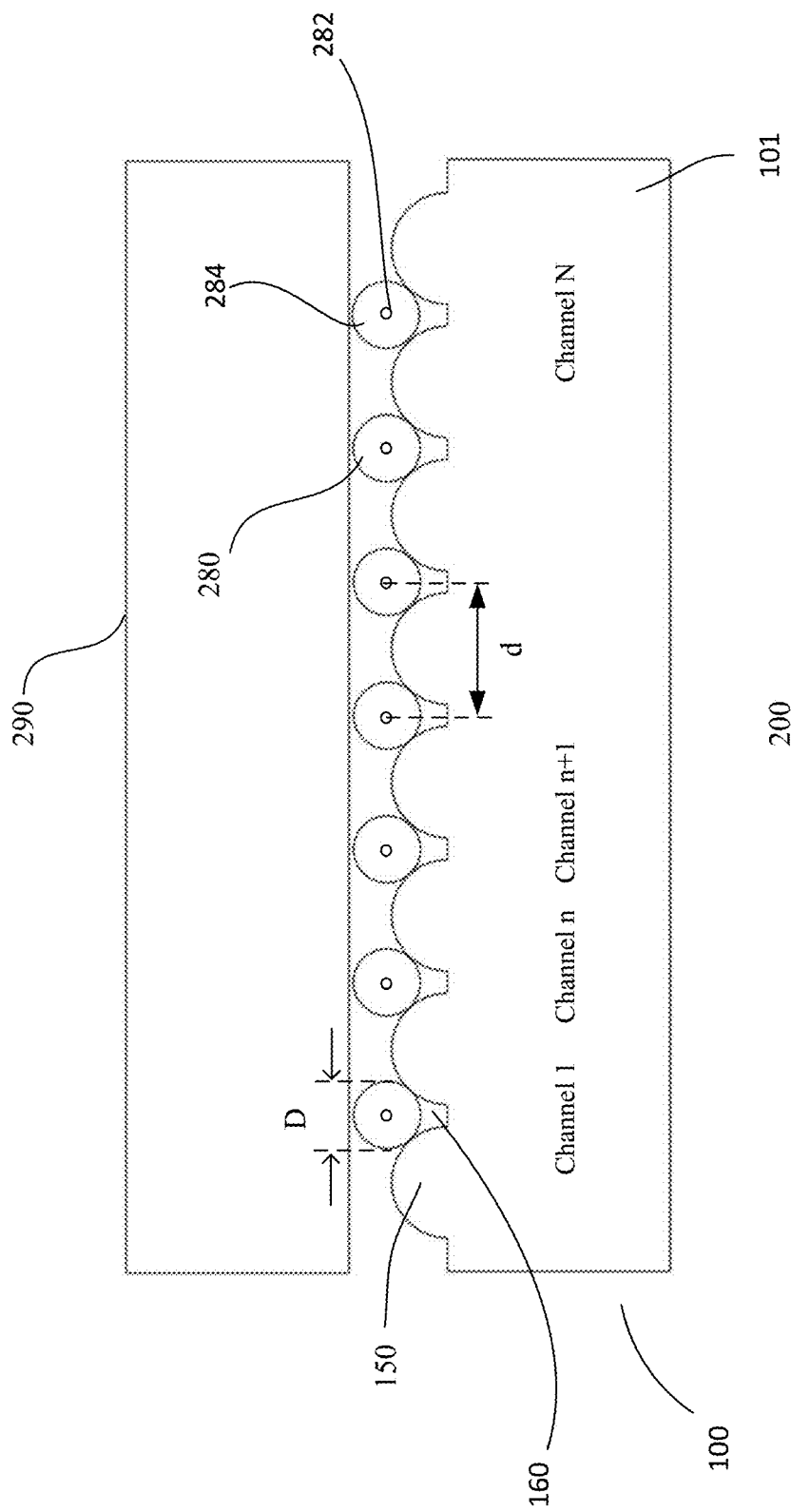
FIG. 2 shows a cross-sectional view of a fiber array with $\gamma$ grooves.

FIG. 2 shows a cross-sectional view of an embodiment of a device 200. As shown, the device is a fiber array. Other types of devices may also be useful. The fiber array includes a fiber array block 100, as described in FIGS. 1a-1b. Common elements may not be described or described in detail. The fiber array block includes a plurality of γ grooves for accommodating optical fibers 280 having diameter D. An optical fiber, as shown, includes a fiber housing 284 surrounding or cladding an optical fiber core 282. A γ groove 160 is disposed between elongated members 150 with convex sidewalls. A γ groove serves as a channel of the fiber array. As shown, the fiber array block includes N grooves, forming a N channel fiber array. As shown, the γ grooves of the fiber array block include a uniform core pitch d. Providing an array block with a non-uniform core pitch may also be useful.

A lid 290, such as a silicon lid, is disposed over the fiber array block. Other types of lids may also be useful. The lid secures the fibers in position in the γ grooves. The lid may be secured over the fiber array block by, for example, clamps or a casing (not shown). Securing the lid by other techniques, such as by using adhesives, may also be useful.

Figure 3A:
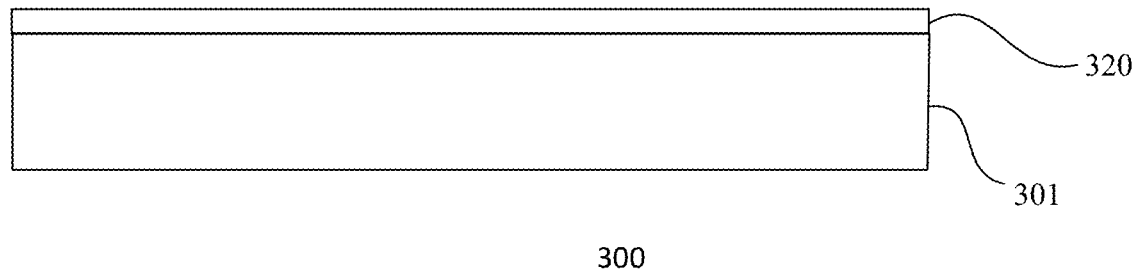
FIGS. 3a-3f show cross-sectional views of an embodiment of a process for forming a device with $\gamma$ grooves.

FIGS. 3a-3f show cross-sectional views of an embodiment of a process 300 for forming a device. The device may be an optical coupling device. For example, the device may be a fiber array. Other types of devices may also be useful. Referring to FIG. 3a, a substrate 301 is provided. The substrate, for example, serves as a substrate for a fiber array block. The substrate may be a silicon substrate. The silicon substrate may be a silicon (100) substrate. Providing a silicon substrate having other crystalline orientations may also be useful. Other types of substrates may also be useful. The thickness of the substrate should be sufficient to serve as a fiber array block. For example, the substrate may be about 1000 μm thick. Other thicknesses may also be useful.

A photoresist layer 320 is formed on the substrate 301. The photoresist layer may be formed by, for example, spin-coating. Other methods of forming a photoresist layer on the substrate may also be useful. The photoresist layer, in one embodiment, is a positive photoresist layer. The thickness of the photoresist layer should be sufficient to serve as an etch mask for subsequently forming the γ grooves. The thickness of the photoresist layer may, for example, be 1 μm to 100 µm. Other thicknesses may also be useful. The thickness uniformity of the photoresist layer may be in the order of about ±2%.

The photoresist layer may be pre-baked. For example, the photoresist layer may be pre-baked at a temperature of about 80° C.-90° C. for about 1 hour. After pre-baking the photoresist layer, it is exposed with an exposure source, such as a UV exposure source, through a reticle with the desired pattern.

Figure 3B:
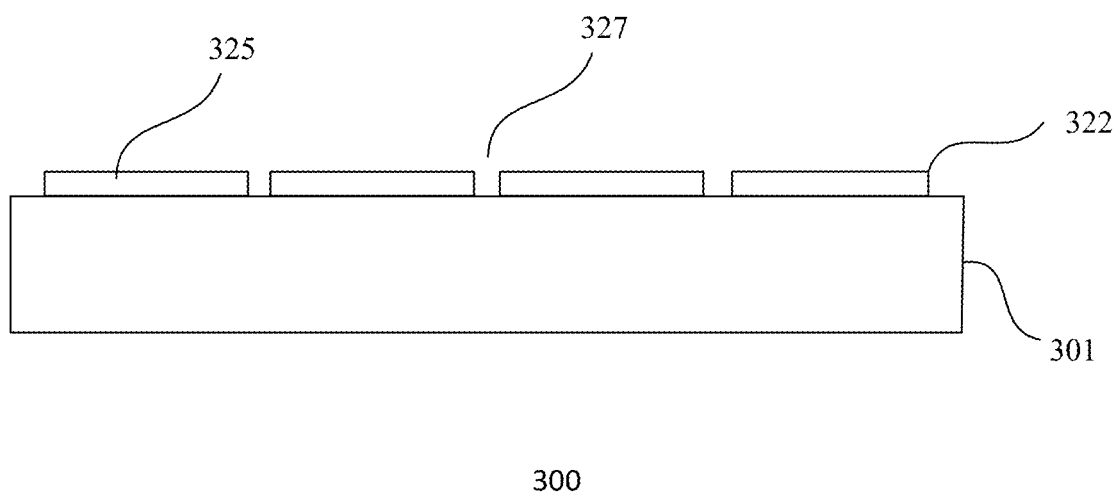

The exposed photoresist layer is developed, transferring the pattern of the reticle to the photoresist layer, as shown in FIG. 3b. For example, the patterned photoresist layer 322 includes elongated resist features 325 separated by spaces 327 corresponding to locations where γ grooves are subsequently formed. For example, the patterned resist layer includes an array of elongated resist features separated by spaces. The width of the spaces may define about widths of the openings of the γ grooves while widths of the elongated resist features define about the pitch of γ grooves.

Preferably, the spaces may have a uniform width to produce γ grooves with uniform width. Providing non-uniform spaces to produce γ grooves with different widths may also be useful. For example, different γ groove widths may be tailored to accommodate different fibers having different diameters. Also, the γ grooves may have a uniform pitch. For example, the pitch may be about 125 µm. Other γ groove pitch may also be useful. The pitch may depend on, for example, the pitch of the gratings of a SiPh device. The pitch may be controlled by varying the width of the elongated photoresist features. In other embodiments, the γ grooves have a non-uniform pitch, which can be achieved by providing elongated photoresist features with different widths.

Figure 3C:
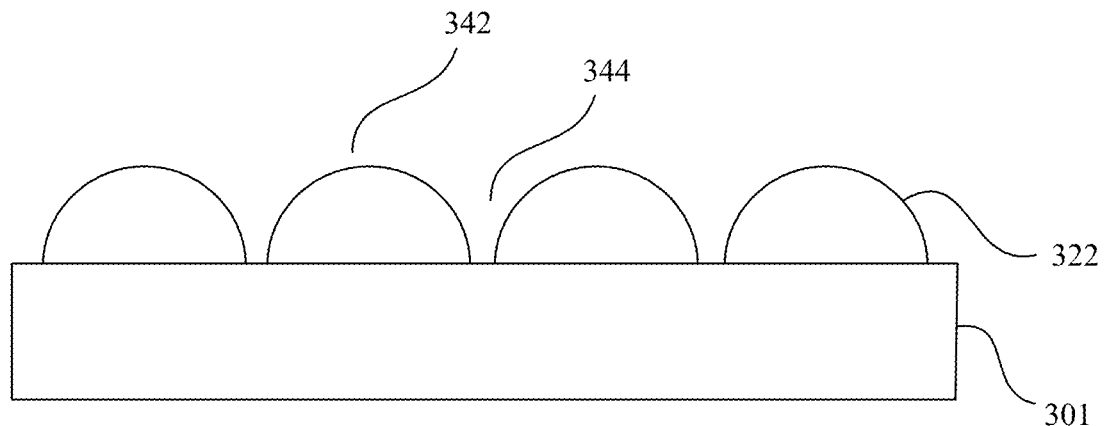

Referring to FIG. 3c, the substrate is processed to transform the vertical sidewalls of the elongated photoresist features to convex curved sidewalls. For example, elongated photoresist features are transformed from features with rectangular surface profiles to features with spherical surface profiles 342. In one embodiment, processing of the substrate includes a reflow process to form elongated photoresist features with spherical profiles. The reflow process, for example, may be a thermal process in a nitrogen ($N_2$) ambient. The reflow temperature may be at about 80-90° C. for a duration of about 1 hour. Performing the reflow process at other temperatures and durations may also be useful.

The reflow process heats the elongated photoresist features above its softening point (e.g., glass transistor temperature). The resist melts, transforming the rectangular profile of the photoresist features to a spherical profile. For example, surface tension causes the profile of the photoresist features to change to a spherical profile. The final profile of the resist feature may depend on the reflow process recipe and cross-sectional dimensions of the photoresist features, such as thickness and width.

Furthermore, the reflow process causes a width of the elongated photoresist features at the base to expand, reducing spaces 344 between the features. To accommodate for the expansion, the spacing between the elongated photoresist features should take into account of the expansion to avoid merging of features as well as to produce γ grooves with the desired widths. To avoid merging, the thickness of the resist features and spacing or gap ratio should be about 10:1. Other thickness to gap ratios may also be useful.

Figure 3D:
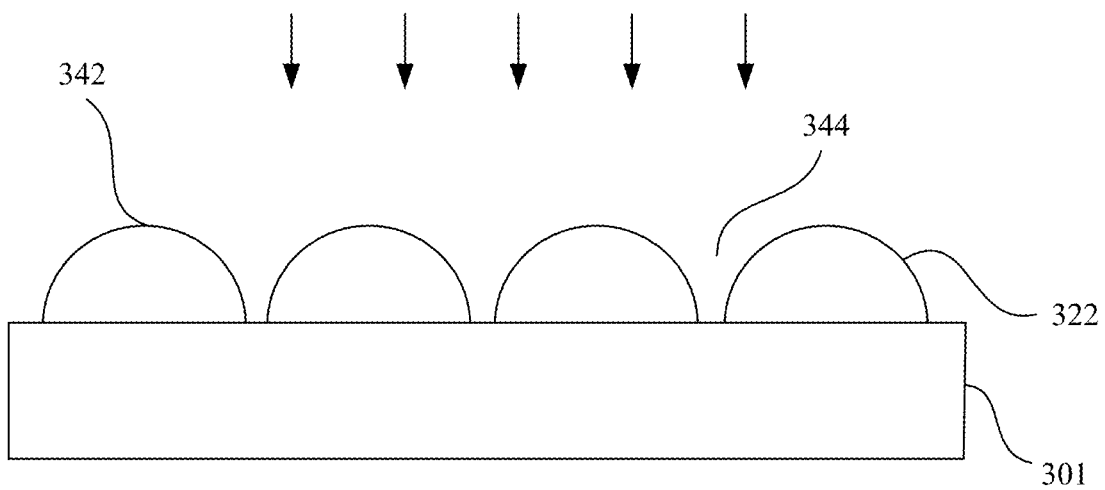
Figure 3E:
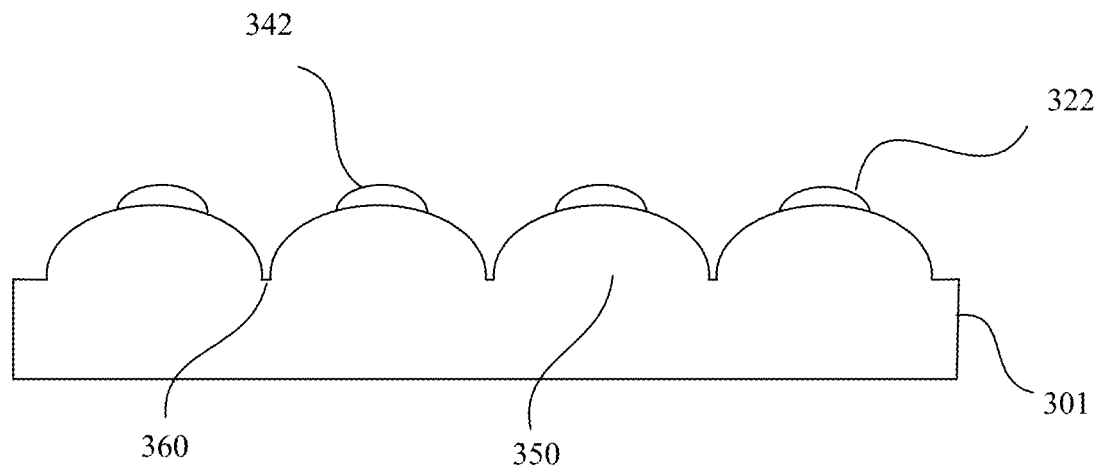

In FIG. 3d, the substrate is subsequently etched using the photoresist features as an etch mask. In one embodiment, the etch is anisotropic dry etch. The dry etch does not employ $K^+$ ions etchants. For example, the etch is a K-free or alkaline-free etch. The dry etch, for example, may be a plasma etch, a RIE or ion milling. The dry etch recipe may be, for example, as described in Table 1 previously. Other K-free dry etch recipes may also be useful. The etch, although etches the substrate anisotropically using the etch mask, the etch mask 322 gets eroded. Due to the spherical profile, the edges of the photoresist features 342 get eroded, exposing the substrate, as shown in FIG. 3e. As the etch continues, more and more of the photoresist features get eroded, exposing more and more of the substrate. This produces elongated members 350 with a convex curved profile in the underlying substrate or device layer to form the γ grooves 360.

Figure 3F:
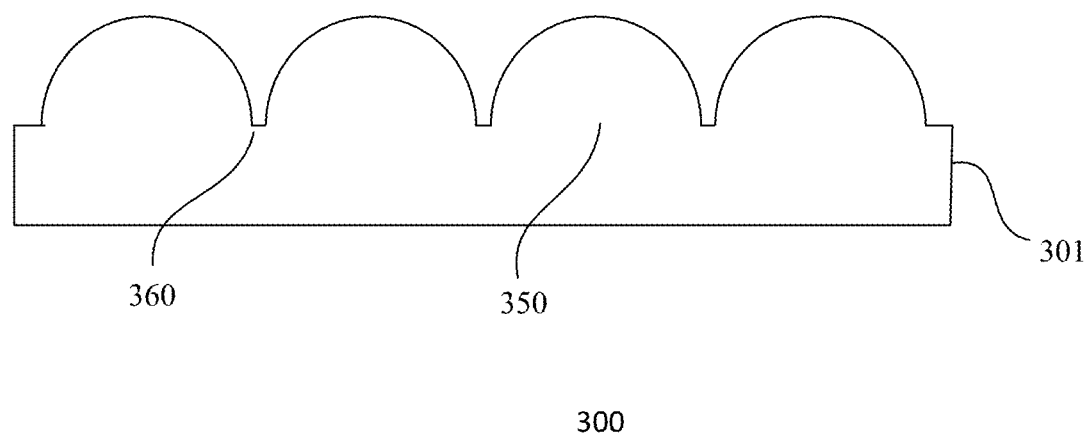

The profile of the elongated members or grooves can be controlled by profile of the elongated photoresist features as well as the length of the etch. Once the desired profile of the grooves is achieved, the etch may be terminated. If the photoresist features remained, they can be removed by, for example, ashing, as shown in FIG. 3f. In some cases, the etch can completely erode the photoresist features. Furthermore, the etch can continue even after the photoresist features are completely removed. This will produce sidewalls with a steeper curve profile. For example, as the etch continues, the sidewall of the grooves will have a more linear property. Furthermore, this will increase the size of the openings of the γ grooves, enabling larger sized diameter fibers to be positioned in therein.

Figure 4A:
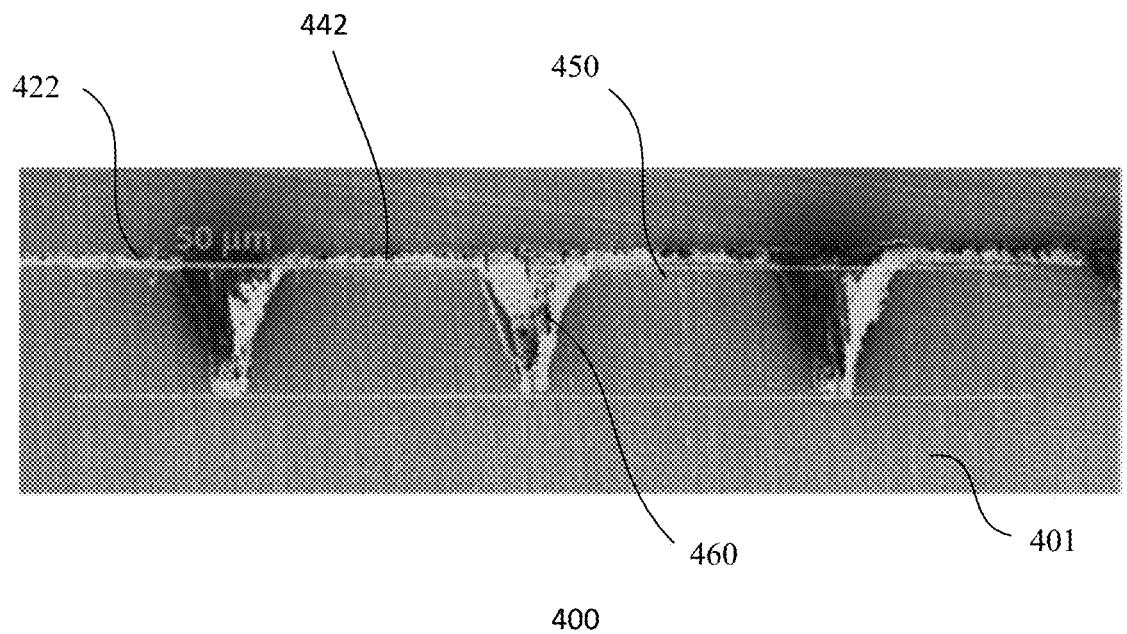
FIGS. 4a-4d show SEM images of various stages of forming $\gamma$ grooves.

FIGS. 4a-4d show scanning electron microscope (SEM) images at different stages of a process 400 for forming γ grooves. In FIG. 4a, a substrate 401 with a patterned photoresist mask 422 having spherical shaped elongated photoresist features 442 is shown. The substrate is etched using RIE to form trenches or γ grooves 460 between an array of elongated members 450. The opening of the top of the trenches is about 50 µm and the depth of the trenches is about 54 µm. The core pitch, e.g., the distance between the bottom of adjacent trenches, is about 125 µm. At this stage of processing, the elongated members resemble half cylinders having a spherical profile, each with steep and curved sidewalls and a flat apex or top surface.

Figure 4B:
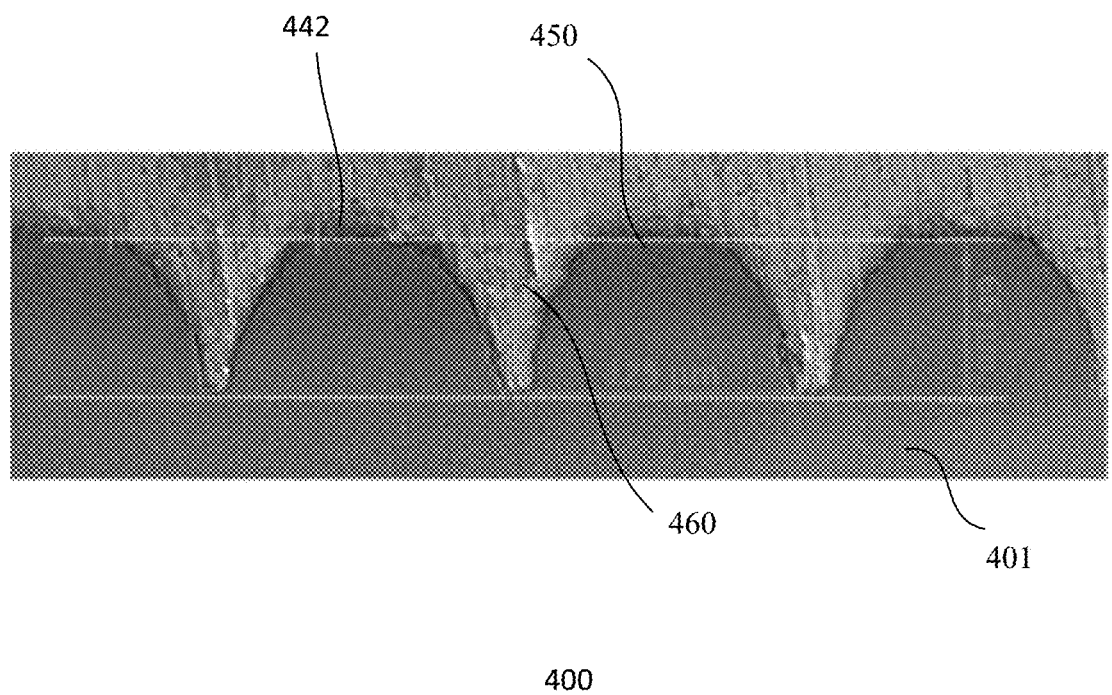

As the etch continues, more and more of the resist features are eroded. Referring to FIG. 4b, the etch completely erodes the photoresist features on top of the elongated members. At this stage of the etch, the opening of the trenches increases to about 73 µm and the depth of the trenches increases to about 66 µm. The core pitch, as shown, remains the same at about 125 µm. As a result of further etching, the elongated members or half cylinder structures adopt a sharpen apex or top surface and sidewalls that curve outward.

Figure 4C:
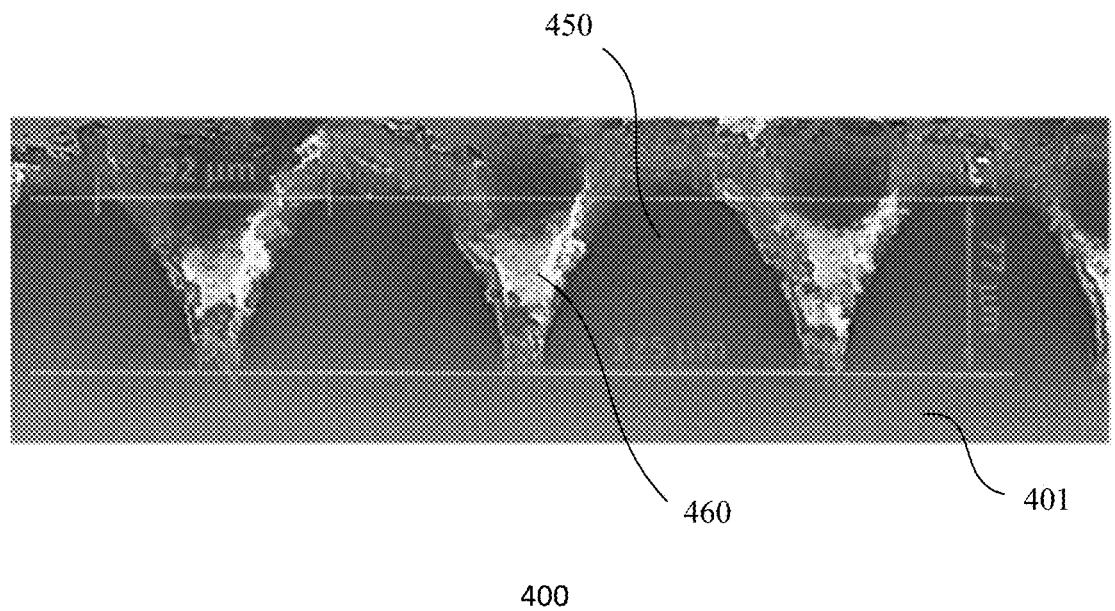

In FIG. 4c, further etching of the substrate after the photoresist features has been completely eroded and results in deeper trenches with wider openings. As shown, the opening of the trenches increases to about 92 µm and the depth of the trenches increases to about 77 µm. The core pitch, as shown, remains the same at about 125 µm. Furthermore, the etch further sharpens the top surface of the half cylinder structures.

Figure 4D:
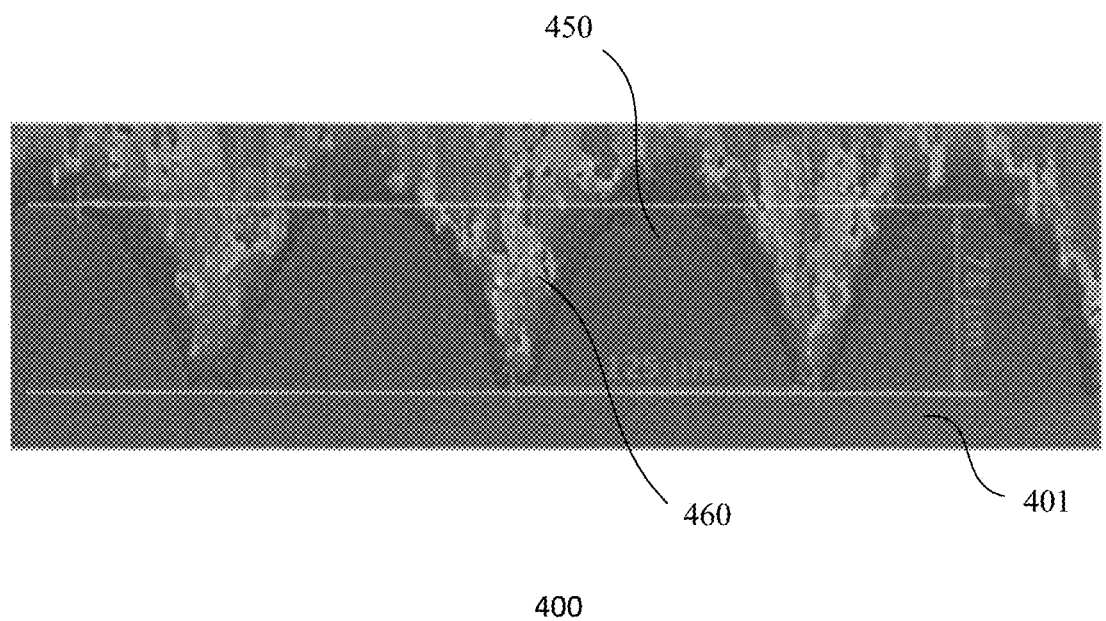

Referring to FIG. 4d, further etching has a bigger effect on the opening width than the depth of the trenches. This is due to the effect of RIE lag, where the bottoms of the deep trenches are experiencing depletion of etching ions. As shown, the depth of the trenches is about 78 µm and the opening width is about 102 µm. The core pitch remains the same at about 125 µm. The etch also further sharpens the top surface of the half cylinder structures.

Figure 5:
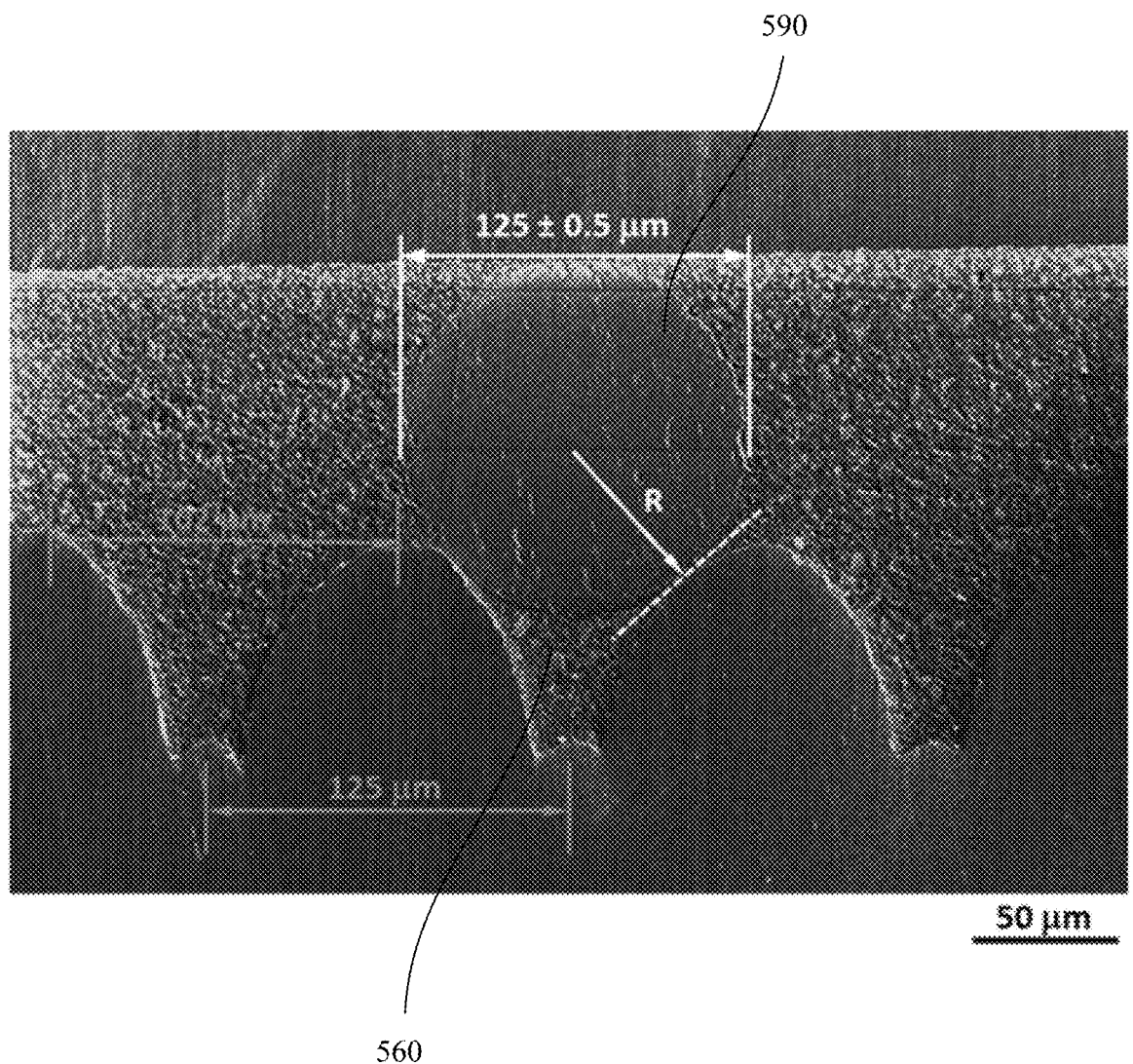
FIG. 5 shows an SEM image of an array of $\gamma$ grooves and an optical fiber.

FIG. 5 shows a SEM image of an optical fiber 590 being fixed in a γ groove 560 of an optical device as previously described. The optical fiber has a diameter of about 125 μm. The opening of the γ groove, as shown, is sufficiently narrow to accommodate the optical fiber. As shown, the optical fiber is resting on the corners of the opening of the γ groove. The optical device is also suitable for optical fibers having smaller diameters. The γ groove, in this case, is sufficiently large to accommodate the optical fiber by allowing the optical fiber to rest deep within the γ groove.

The embodiments may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

The invention claimed is:

1. A method of forming a device, the method comprising:
    providing a substrate;
    forming a patterned photoresist etch mask on the substrate, wherein the patterned photoresist etch mask comprises first and second elongated photoresist features with respective rectangular profiles, and the first and second elongated photoresist features are separated by a space that exposes the substrate surface;
    reflowing the first and second elongated photoresist features with a thermal reflow process to transform the respective rectangular profiles to respective half-cylinder shapes;
    after reflowing the first and second elongated photoresist features, performing a dry etch using the patterned photoresist etch mask, wherein the dry etch etches the exposed surface of the substrate to form a gamma groove having convexly-curved groove sidewalls; and
    positioning an end of an optical fiber into the gamma groove.

2. The method of claim 1 wherein the first and second elongated photoresist features are included in an array of elongated photoresist features, and
    forming the patterned photoresist etch mask forms the array of elongated photoresist features separated by spaces that expose the substrate surface,
    wherein a plurality of gamma grooves in the substrate are formed in the spaces between the array of elongated photoresist features by the thermal reflow process and the dry etch, and each gamma groove has convexly-curved groove sidewalls.

3. The method of claim 2 wherein a pitch of the plurality of gamma grooves is uniform.

4. The method of claim 2 wherein a pitch of the plurality of gamma grooves is non-uniform.

5. The method of claim 2 wherein the plurality of gamma grooves includes uniformly-sized groove openings.

6. The method of claim 2 wherein the plurality of gamma grooves includes groove openings that are not all uniform in size.

7. The method of claim 2 further comprising:
    positioning ends of optical fibers on the array of gamma grooves; and
    mounting a lid on the substrate with the optical fibers positioned on the array of gamma grooves to form an optical fiber array.

8. The method of claim 1 wherein the substrate comprises a silicon substrate.

9. The method of claim 1 wherein:
    the substrate comprises a device layer; and
    the gamma groove is formed in the device layer.

* * * * *